(12) United States Patent
Puaud et al.

(10) Patent No.: US 8,182,853 B2
(45) Date of Patent: May 22, 2012

(54) HIGH PRESSURE FREEZING OF FROZEN DESSERTS

(75) Inventors: Max Puaud, Pisseleu (FR); Hans-Juergen Erich Wille, St Martin le Noeud (FR); Dietrich Knorr, Berlin (DE); Marcus Volkert, Berlin (DE)

(73) Assignee: Nestec S.A., Vevey (CH)

( * ) Notice: Subject to any disclaimer, the term of this patent is extended or adjusted under 35 U.S.C. 154(b) by 558 days.

(21) Appl. No.: 12/299,761

(22) PCT Filed: May 9, 2007

(86) PCT No.: PCT/EP2007/054471
§ 371 (c)(1), (2), (4) Date: Nov. 5, 2008

(87) PCT Pub. No.: WO2007/128826
PCT Pub. Date: Nov. 15, 2007

(65) Prior Publication Data
US 2009/0202701 A1    Aug. 13, 2009

(30) Foreign Application Priority Data
May 9, 2006 (EP) .................... 06113695

(51) Int. Cl.
A23L 3/37 (2006.01)
(52) U.S. Cl. ........ 426/317; 426/320; 426/327; 426/334; 426/335; 426/565; 426/524
(58) Field of Classification Search ................. 426/312, 426/317, 320, 327, 565, 524, 334, 335; 62/68–70
See application file for complete search history.

(56) References Cited

U.S. PATENT DOCUMENTS

| 2,343,767 | A  | * | 3/1944  | Charles Getz    | 426/565 |
| 3,615,718 | A  | * | 10/1971 | Weinstein       | 426/116 |
| 4,272,558 | A  | * | 6/1981  | Bouette         | 426/660 |
| 4,347,707 | A  |   | 9/1982  | Zemelman et al. | 62/69   |
| 4,659,575 | A  | * | 4/1987  | Fiedler         | 426/317 |
| 4,891,235 | A  | * | 1/1990  | Mizuguchi et al.| 426/281 |
| 6,033,717 | A  |   | 3/2000  | Agterof et al.  | 426/665 |
| 6,156,367 | A  | * | 12/2000 | Keenan et al.   | 426/565 |
| 6,497,913 | B1 | * | 12/2002 | Gray et al.     | 426/565 |
| 7,781,006 | B2 | * | 8/2010  | Brisson et al.  | 426/565 |
| 2003/0170356 | A1 | * | 9/2003 | Yuan et al.    | 426/313 |

(Continued)

FOREIGN PATENT DOCUMENTS

DE   4 226 255   2/1994

(Continued)

OTHER PUBLICATIONS

International Search Report PCT/EP2007/054471 Dated Aug. 22, 2007.

(Continued)

Primary Examiner — Drew E Becker
(74) Attorney, Agent, or Firm — Winston & Strawn LLP (57) ABSTRACT

A method for preparing a pasteurized frozen dessert by mixing unpasteurized ingredients for the frozen dessert, the ingredients including water, cooling the unpressurized mix, pressurizing the cooled mix together with a gas with a pressure of more than 1000 bar, preferably more than 2000 to 4000 bar, thus pasteurizing the mix, cooling the pressurized mix, and releasing the pressure such that the water crystallizes to form the frozen dessert.

19 Claims, 6 Drawing Sheets

U.S. PATENT DOCUMENTS

| | | | |
|---|---|---|---|
| 2004/0033296 A1* | 2/2004 | Yuan et al. | 426/326 |
| 2005/0037110 A1* | 2/2005 | Windhab et al. | 426/100 |
| 2005/0123666 A1* | 6/2005 | Vaghela et al. | 426/565 |

FOREIGN PATENT DOCUMENTS

| | | |
|---|---|---|
| RU | 2 274 248 | 4/2006 |
| WO | WO 95/08275 | 3/1995 |
| WO | WO 95/24132 | 9/1995 |
| WO | WO 98/18350 | 5/1998 |
| WO | WO 00/01246 | 1/2000 |
| WO | WO 00/72703 A1 | 12/2000 |

OTHER PUBLICATIONS

Antonio J. Trujillo et al., XP-002401536, "*Applications of High-Hydrostatic Pressure on Milk and Dairy Products: A Review*", Innovative Food Science & Emerging Technologies, vol. 3, No. 4, pp. 295-307 (2002).

M.G. Hayes et al., XP008069638, "*Influence of High Pressure Homogenization on Some Characteristics of Ice Cream*", Milchwissenschaft, vol. 58, No. 9-10, pp. 519-523 (2003).

* cited by examiner

Standard process (-5°C)

Figure 7

High Pressure Process

Figure 8

HIGH PRESSURE FREEZING OF FROZEN DESSERTS

This application is a 371 filing of International Patent Application PCT/EP2007/054471 filed May 9, 2007.

BACKGROUND

The present invention relates to the preparation of an aerated frozen dessert in which an ingredient mix for the frozen dessert is subjected to a ultra-high pressure.

The term "aerated" relates to the fact that small gas cells are present throughout the finished frozen product.

"Foaming" relates to an expansion of a compressed, liquefied or dissolved gas in the ingredient mix for the frozen product, wherein the foaming results in an aeration of the frozen product.

The term "overrun" refers to the degree of aeration of the frozen product.

WO 98/18350 teaches a process for the preparation of an ice confection, wherein the ice confection is subjected to an ultra high pressure treatment. The pressure during the high pressure treatment is said to be preferably 4000 bars. The ultra high pressure treatment is carried out before the freezing step and after a pasteurization step. The pressure is used to cause a protein gel formation positively contributing to the texture of the ice confection.

The foregoing process is not used for foaming or freezing of the ice confection mix. In contrast, the present invention now discloses a process to simplify the sequence of steps necessary for preparing a frozen dessert by using high pressure treatment.

SUMMARY OF THE INVENTION

The present invention advantageously prepares an aerated frozen dessert or ice confection by making use of ultra high pressure. In the process of the invention, the ultra high pressure including the release such pressure is used as a way to freeze and foam the ingredient mix.

According to a first aspect of the present invention a method for preparing a frozen dessert is proposed, wherein ingredients for the frozen dessert, comprising water, are mixed. The mix is then cooled, together with a gas, to a temperature below 0° C. and, preferably simultaneously, pressurized, the resulting pressure being higher than 1000 bar, preferably more than 2000 bar. The pressure is then released, such that the water crystallizes. At the end a finished frozen dessert will be present at temperatures below 0° C. and at ambient pressure.

Preferably the step of releasing the pressure also creates a foamy texture of the frozen dessert. This foamy texture is achieved by the expansion of the introduced gas.

The gas can be any food grade gas and can be an insoluble gas such as e.g. air or a soluble gas such as e.g. $CO_2$.

The mix can be cooled before, during and/or after it is pressurized.

According to a further aspect of the present invention a method is proposed in which unpasteurized ingredients of the frozen dessert, comprising water, are mixed. The unpressurized mix can be cooled. Then the mix is pressurized together with a gas up to a pressure of more than 1000 bar, preferably more than 2000 bar, the pressurization being adapted to bacterially inactivate the mix. The pressurized mix can be continued to be cooled.

Finally the pressure is released to ambient pressure, which causes the water to crystallise. Simultaneously the foaming of the ingredient mix to an aerated frozen product can take place.

Preferably the pressurized mix is cooled to a temperature substantially below 0° C., preferably −10° C. and lower.

The mix can be pressurized to a pressure of more than 3000 bars, preferably more than 4000 bars.

The mix can be pressurized and cooled such that the introduced gas is liquefied under the pressure and temperature conditions present.

The invention also relates to a low fat and/or low sugar ice cream which is obtainable by the high pressure freezing method.

Further features, examples and advantages of the present invention will now become apparent for the man skilled in the art when reading the following detailed description of preferred embodiments of the present invention when taking in conjunction with the figures of the enclosed drawings.

DETAILED DESCRIPTION OF THE INVENTION

Figure 1:
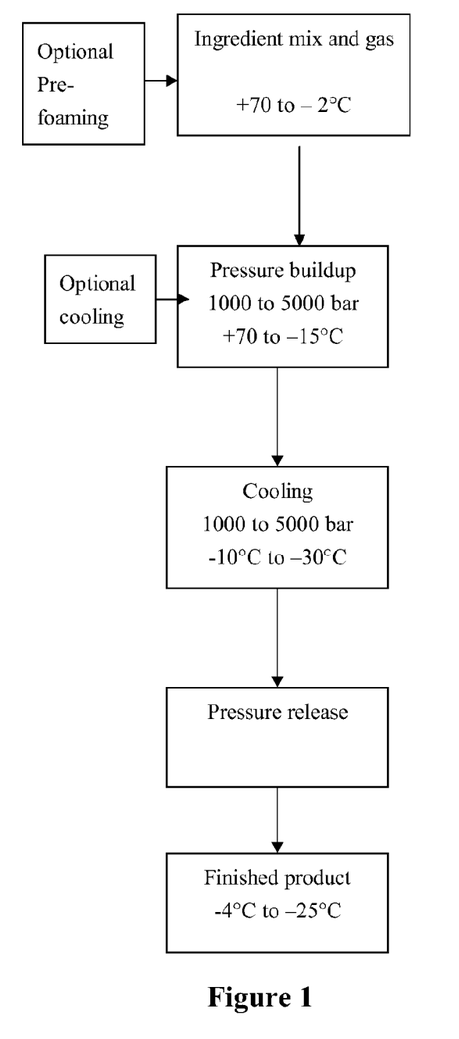
FIG. 1 shows a sequence of steps according to a first aspect of the present invention.

As shown in FIG. 1, in a first step an ingredient mix for a frozen confectionery or frozen dessert is prepared. The mix comprises water. Initially the mix is present at ambient pressure (1 bar) and is kept a temperature of between +70° C. and −2° C.

The ingredient mix contains the ingredients for the desired frozen dessert, i.e. a sorbet, water ice, ice cream, mellorine, sherbet etc.

The mix is then brought together with a food grade gas, which can be a soluble gas such as e.g. $CO_2$ or an insoluble gas such as e.g. air.

In a following step, the mix is pressurized together with the food grade gas. The amount of gas enclosed with the ingredient mix determines the degree of aeration (overrun) of the finished product.

According to a first alternative at this stage, i.e. before and during the pressurization the ingredient mix does not yet present the texture of a fine foam. The fine foamy texture is achieved by the pressure release step, which will be explained later on.

According to a second alternative the ingredient mix is pre-foamed before the pressurization step. Preferably the pre-foaming is made using an insoluble gas such as e.g. air. When the pre-foamed ingredient mix is pressurised, this will lead either to a gas-liquid transition or preferably this will lead to highly compressed cells of the pre-foaming gas.

The pressurization of the ingredient mix can be carried out up to a pressure of 1000 bar, preferred more than 2000 bar, more preferred up to 3000 bar and most preferred up to 5000 bar. During and at the end of the pressurization the temperature of the mix is kept in a range between +70° C. and −15° C.

The pressurization of the ingredient mix and the food grade gas will lead
- to a transition of the gas into a liquid,
- ultra-high compressed gas "droplets", and/or
- a transition of the gas into the dissolved state in case a soluble gas is used.

In a following step, the pressurized mix is cooled to a temperature of −10° C. to −30° C.

In a following step, the pressure of the pressurized mix is released to ambient pressure. During the pressure release a rapid crystallisation of the water present in the mix occurs (pressure shift freezing). Further on, the expansion of the gas comprised in the mix leads to a gas bubble nucleation, which results in an aerated frozen dessert with foamy texture having small air bubble.

The rapid crystallisation (and/or re-crystallisation) and foaming brings about a frozen aerated product with smooth texture, whereby the sugar and/or fat content can be kept low.

Figure 7:
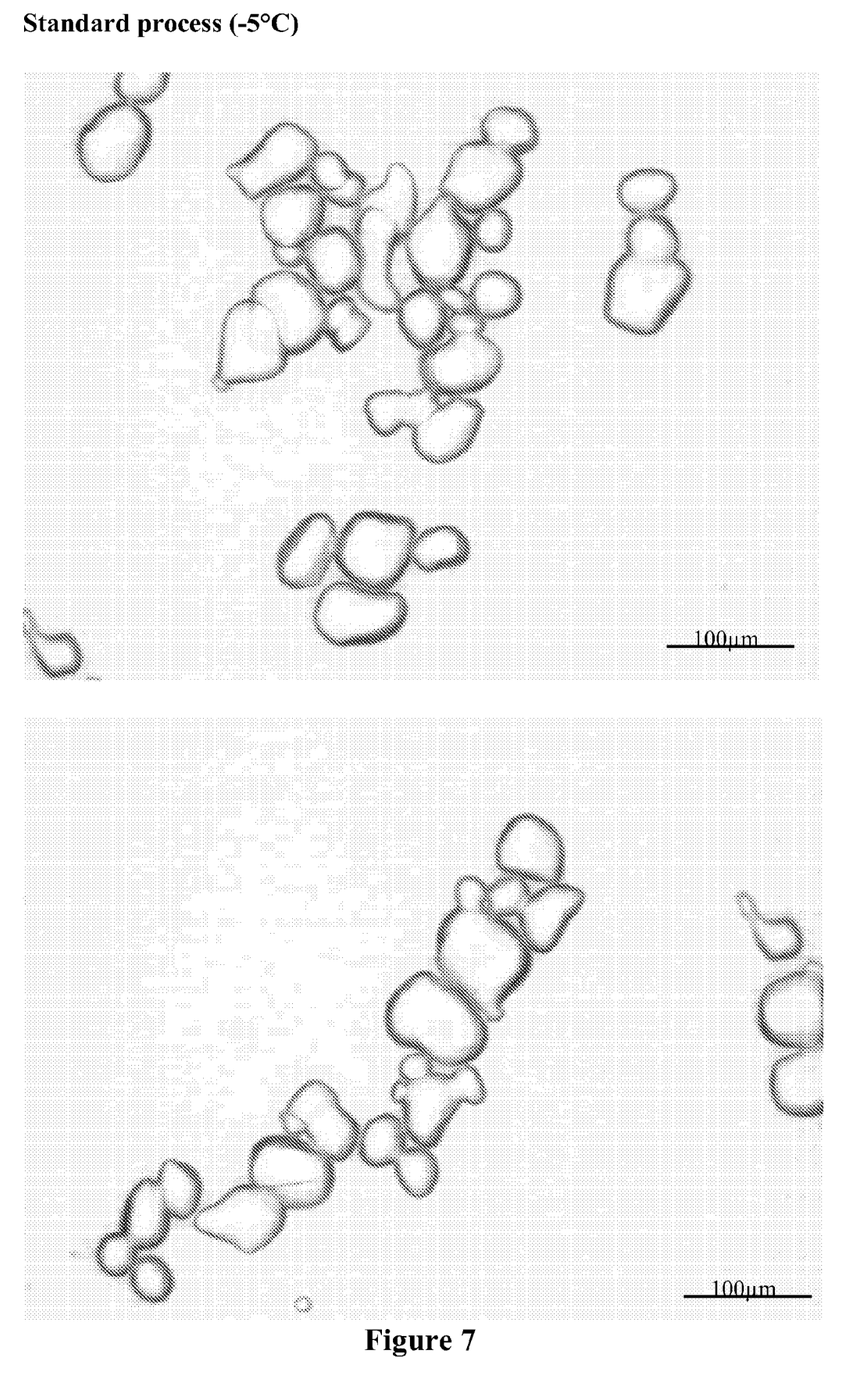
FIG. 7 is a picture of ice crystals of a standard frozen confection.
Figure 8:
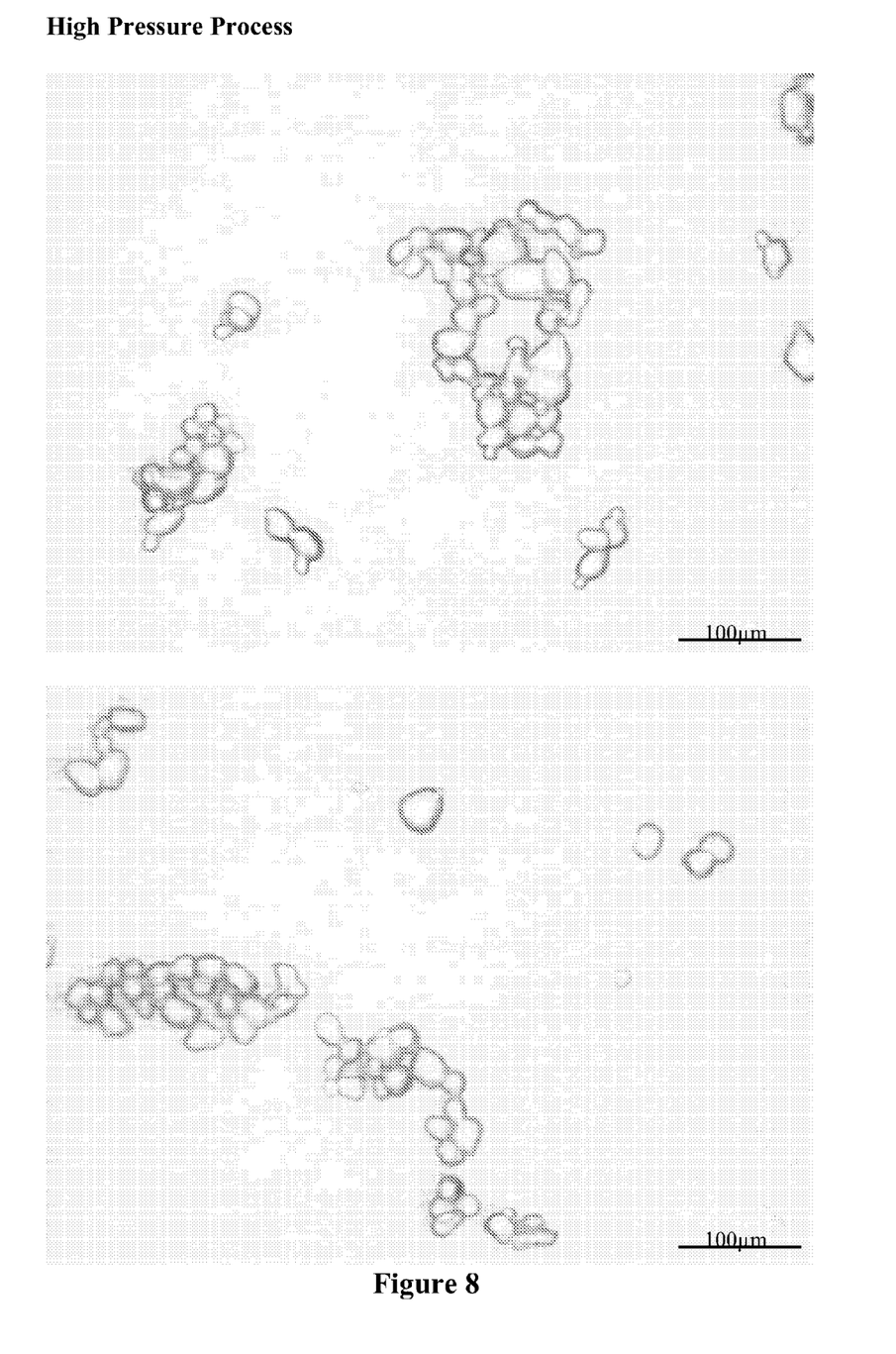
FIG. 8 is a picture of a ice crystals of a frozen confection prepared according to the invention.

FIG. 7 is a picture of ice crystals of a standard frozen confection. The average crystal size is about 29 μm. FIG. 8 is a picture of ice crystals of a frozen confection prepared according to the invention. The average crystal size is about 17 μm. The difference in average crystal size indicates that the process used allows to obtain a smaller ice crystal size with the same recipe. According to the invention a frozen confection can be provided with an average crystal size below 20 mμ, particular advantageously the average crystal size can be 17 μm or lower.

According to the invention the foaming of the frozen dessert and the crystallization of the water contained in the ingredient mix occurs essentially during the same step.

Note that the water in the ingredient mix can already be frozen (at least partially) before the pressure release step, such that alternatively or additionally a re-crystallisation of ice crystals already present at high pressure can occur during the pressure release.

Under the formation of ice crystals energy is released. This result in an increased product temperature which can be seen in the phase diagram during pressure release step.

At the end of the pressure release step, the finished frozen product will be present at ambient pressure at a temperature of −4° C. to −25° C. Subsequently the aerated frozen product can be cooled to a storage temperature of e.g. −18° C.

The overrun of the aerated product preferably is in a range of between 30% and 200%, preferably 80% to 150%.

Figure 2:
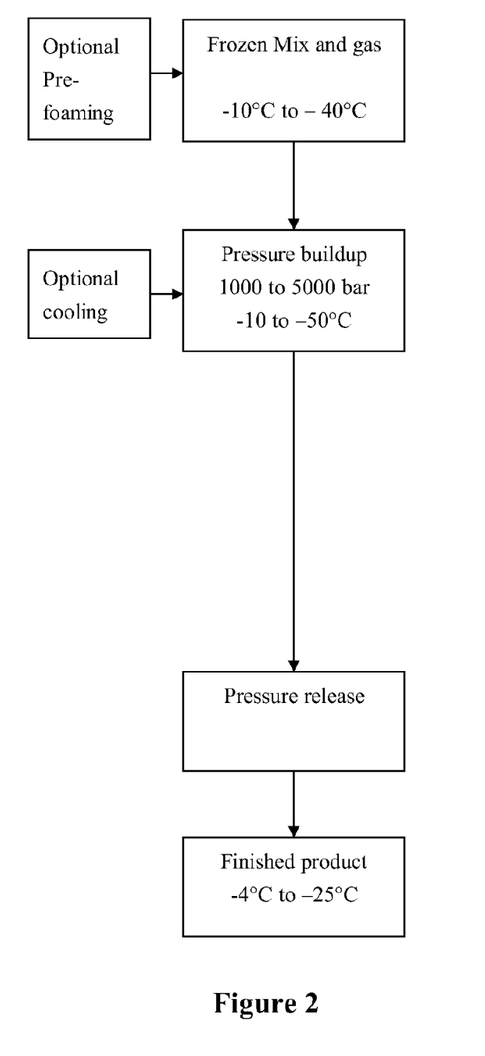
FIG. 2 shows an alternative sequence of steps according to the present invention.

FIG. 2 shows an alternative process, in which the ingredients for the frozen dessert or confectionery, including water and a food grade gas, are at first frozen at ambient pressure in a temperature range of −10° C. to −40° C.

The pressurising is carried out on the frozen mix.

Finally, comparable to the sequence of FIG. 1, the pressure will be released to ambient pressure and at the end of the pressure release step the frozen finished product will be present at ambient pressure and at a temperature of −4° C. to −25° C., more preferred at −18° C. and below.

Figure 5:
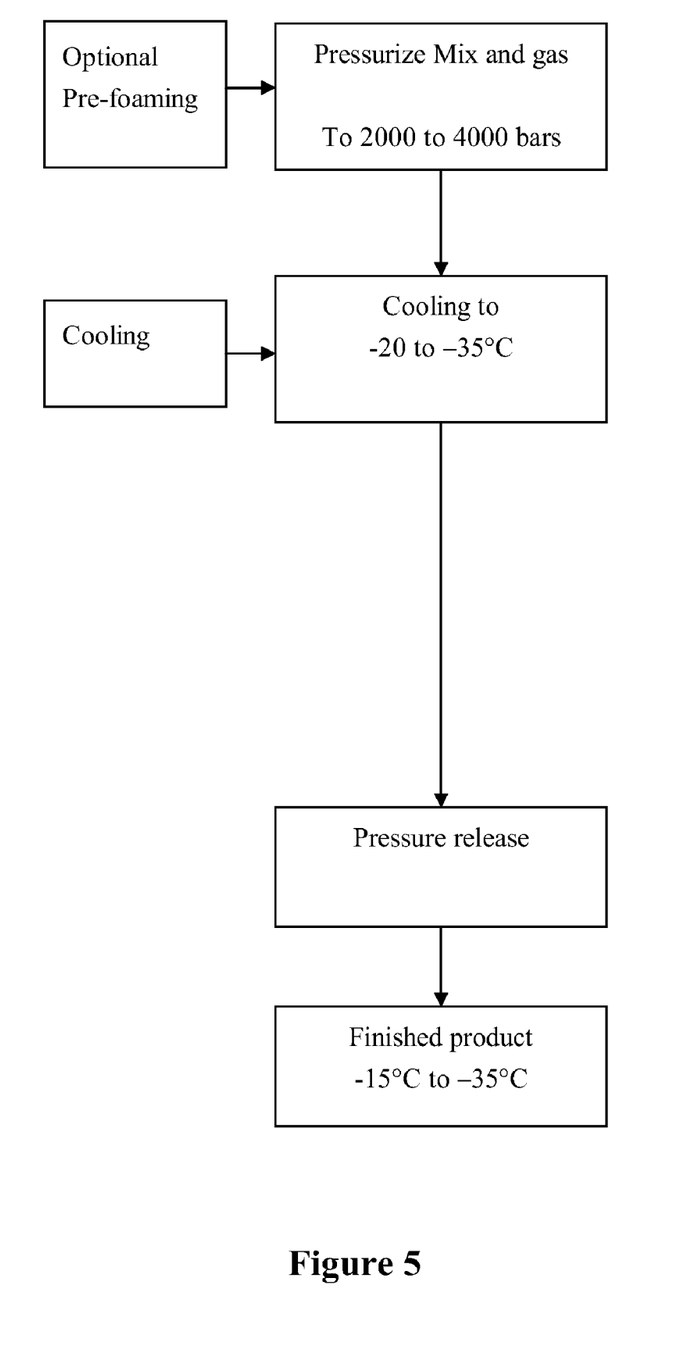
FIG. 5 shows an further alternative sequence of steps according to the present invention

FIG. 5 shows a further alternative process, in which the ingredient of the frozen dessert or confectionery, including water and a food grade gas, are at first prefoamed. Preferably the pre-foaming is made using an insoluble gas such as e.g. air.

Figure 6:
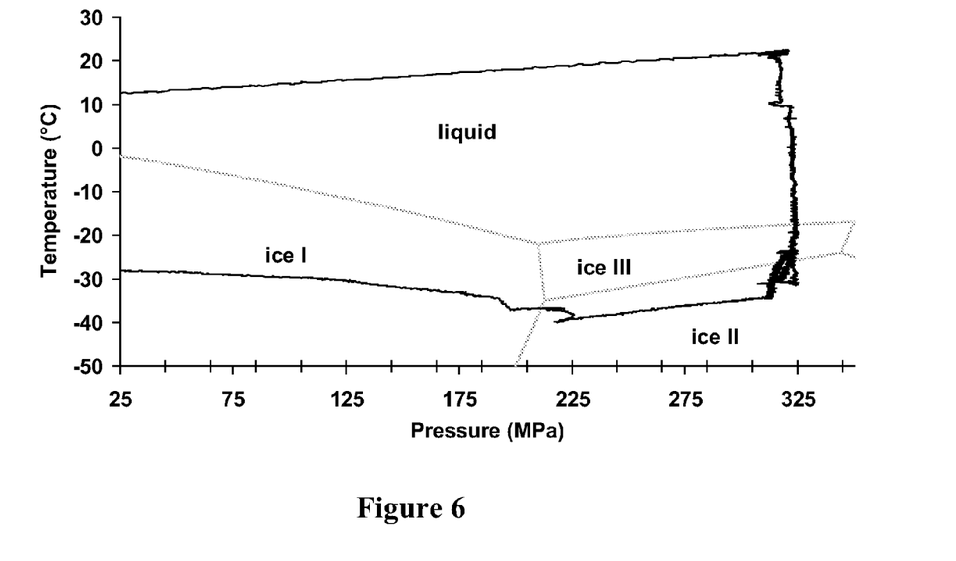
FIG. 6 shows a phase diagram of the process of FIG. 5.

In the following step, the prefoamed mix is pressurized up to a pressure of more than 2000 bar, preferable up to 3000 bar and most preferred up to 4000 bar. The mixture is then cooled down to less than −20° C., preferable below −35° C. It is believed that ice nucleation can occur in the Ice II, Ice III, or Ice V part of the phase diagram depending on the pressure applied, see FIG. 6. This type of freezing is also referred to as pressure assisted freezing.

In a following step, the pressure of the pressurized mixture of liquid mix and ice crystals is released to ambient pressure.

During the pressure release a re-crystallisation is resulting if ice crystals were already formed. A pressure shift freezing of some of the remaining water also occurs. Further on, the expansion of the gas comprised in the mix leads to a gas bubble nucleation, which results in an aerated frozen dessert with foamy texture having small air bubble. The foam expansion can occur over varying times depending on the finished product temperatures.

The end product is a foam product having a temperature of −15 to −35° C. The process may preferably be controlled so that the temperature of the end product is at least −18° C. At this product end temperature the frozen dessert or confectionery product would not need to be subjected to a hardening step. Further, a product end temperature of below −18° C. has the advantage that the texture properties obtained with the process according to the invention is not affected by the hardening step.

The overrun of the aerated product preferably is in a range of between 30% and 200%, preferably 80% to 150%.

Preferably the maximum pressure values and the pressurising time duration are set such that the ingredient mix is bacterially inactivated. In other words, the high pressure leads to a high-pressure mediated cell death of microorganisms eventually present in the ingredient mix. Preferably the ingredient mix is not pasteurized before undergoing the pressurising step.

In order to promote the bacterial inactivation, the ingredient mix and the food grade gas are allowed to heat during the pressurization and are actively cooled after the peak of the pressurization has been reached.

The invention thus makes a particularly advantageous use of the following features:
- the low-temperature shift of freezing point of water under high pressure,
- the bacterial inactivation under very high pressure, and
- the transition of a gas into liquid, highly compressed cells or into the dissolved state under ultra high pressure.

When using the present invention, the use of a hardening tunnel is no longer necessary, although optionally the invention also encompasses the subsequent use of such hardening tunnel.

The invention brings about the advantage that it can find application for the production of low fat ice cream, low sugar ice cream and low fat/sugar ice cream with satisfying texture and structure.

It has been found out that low fat and/or low sugar products with relatively low amounts (e.g. less than 5%) of bulking agents (such as e.g. polydextrose, maltodextrins etc.) can be produced.

In the following working examples of the invention shall be explained, which shall serve for illustration purposes only.

Example

"Standard" Ice Cream Recipe

| | |
|---|---|
| Water | 55-65% |
| Stabiliser blend | 0.3 to 0.7% |

| | |
|---|---|
| Whey powder | 7 to 11% |
| Skimmed milk powder | 1.5 to 3% |
| Sugar | 6 to 12% |
| Glucose syrup (40 DE) | 6 to 12% |
| Vegetable fat | 6 to 12% |
| Colors | 0.004% |
| Flavours | 0.1% |

Pressure Equipment

The freezing processes were performed in a high pressure vessel of 1.6 litres internal volume (Uhde GmbH, Hagen, Germany). The temperature of the vessel was controlled externally by a cooling jacket connected to flexible tubes containing circulating silicon oil, cooled in a cryostat. The pressure was built up with an air driven pump. The pressure transmitting medium used is min 50% v/v mixture of ethanol/water, freezing point<−42° C. The temperature of the non-sealed upper sample was directly measured using a type K thermocouple. Pressure was measured using a pressure transducer.

High Pressure Part of the Process as Shown in FIG. 1

This example starts from a liquid pre-foamed ingredient mix above 0° C.

The liquid ingredient mix was then pressurized up to about 350 MPa. The typical adiabatic heating occurred during the pressure build up phase.

After the pressurization the ingredient mix was cooled to a temperature of about −20° C.

After temperature equilibrium a rapid pressure release at −20° C./350 MPa was applied, wherein the pressure was essentially released to ambient pressure.

The pressure release caused supercooling and initiated nucleation and crystallization to the crystal region ICE I throughout the sample. The crystallization resulted in an instant temperature increase from −30° C. to around −8° C. The sample was subsequently cooled down to the desired storage temperature of some −25° C.

Figure 3:
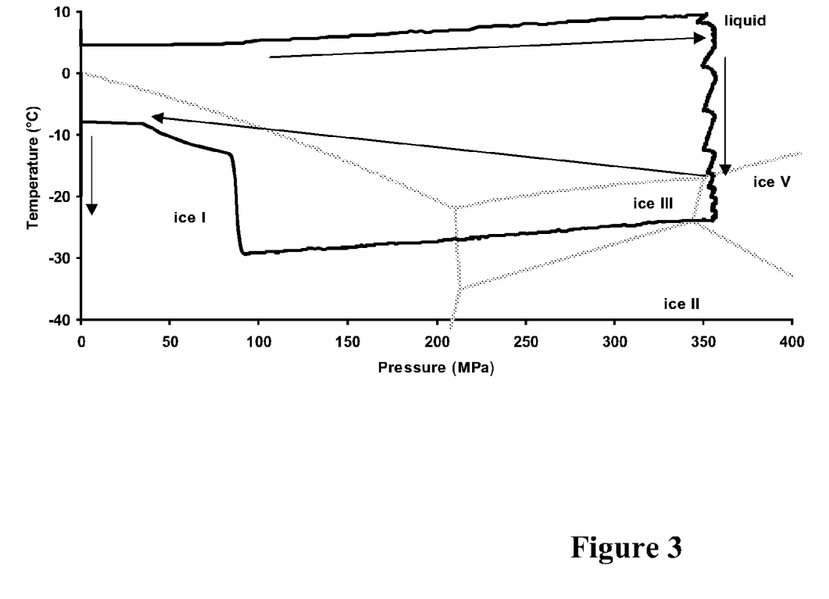
FIG. 3 shows a phase diagram of the process of FIG. 1.

FIG. 3 illustrates the time-temperature-pressure profile and the temperature-pressure diagram together with the water phase diagram.

High Pressure Part of the Process as Shown in FIG. 2

The experiment uses a pre-foamed ingredient mix. The samples were first cooled down to about −35° C. and then the frozen ingredient mix was pressurized to about 350 MPa.

Typical adiabatic heating occurred during the pressure build up phase.

After temperature equilibrium had been reached (about −35° C.) a rapid pressure release at was applied. It caused re-crystallisation to ICE I throughout the sample. The re-crystallization resulted in an temperature increase from −35° C. to around −20° C. The sample was subsequently cooled down to the desired storage temperature of −25° C.

Figure 4:
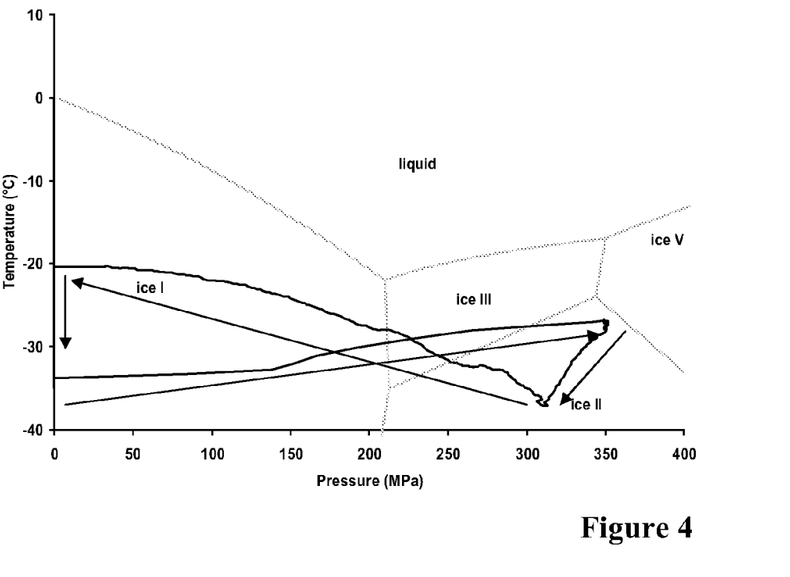
FIG. 4 shows a phase diagram of the process of FIG. 2.

FIG. 4 illustrates the time-temperature-pressure profile and the temperature-pressure diagram together with the water phase diagram.

Note that ICE I, ICE II, ICE III and ICE IV in FIGS. 3 and 4 designate crystal phase with differing characteristics.

Example

Low Fat/Low Sugar Ice Cream

The following recipe together with the method according to the present invention allows the production of an ice cream with essentially the same sensory and stability properties as standard ice cream:

low sugar content (5-10%),
low fat content (e.g 1-3% fat),
additional ingredients (less than 5% bulking agent),
protein source,
water.

What is claimed is:

1. A method for preparing a frozen confection having a smooth texture, which comprises:
mixing unpasteurized ingredients for the frozen confection to form an ingredient mix, the ingredients comprising water;
pressurizing the ingredient mix together with a food grade gas with a pressure of greater than 1000 bar;
providing the pressurized ingredient mix at a temperature below 0° C. by cooling if necessary; and
releasing pressure from the pressurized mix to a level corresponding to ambient pressure while the temperature of the mix is maintained below 0° C. to provide freezing and foaming of the ingredient mix, such that the water in the mix crystallizes or water crystals in the mix re-crystallize to thus form the frozen confection with an average ice crystal size that is smaller than that obtainable from the same ingredient mix processed at conventional pressure that is lower than 1000 bar.

2. The method according to claim 1, wherein an aerated frozen confection is provided by providing the mix at a temperature of between −10° C. and −40° C. with cooling if necessary prior to pressurizing, such that when the pressure is released to a level corresponding to ambient pressure, the frozen mix is aerated to form the aerated frozen confection.

3. The method according to claim 2, wherein the mix is cooled to a temperature of −20° C. or below prior to pressurizing.

4. The method according to claim 1, wherein the pressurized ingredient mix is cooled to a temperature of −20° C. or below during the release of pressure to simultaneously freeze and foam the mix.

5. The method according to claim 1, wherein the releasing of pressure is conducted in a manner to create a foamy texture of the frozen confection.

6. The method according to claim 5, wherein the foamy texture is created by control of gas bubble nucleation or control of growth of bubbles that are already present in the pressurized state.

7. The method according to claim 1, wherein the gas is air or another mix-insoluble gas.

8. The method according to claim 1, wherein the gas is carbon dioxide or other mix-soluble gas.

9. The method according to claim 1, wherein the ingredient mix is cooled before, during or after the pressurizing step to assist in forming of the frozen confection.

10. The method according to claim 1, wherein the pressurizing is carried out such that the mix is bacterially inactivated.

11. The method according to claim 1, wherein the ingredient mix and the food grade gas are pressurized under such conditions that the food grade gas is liquefied, highly compressed or at least partially dissolved in the ingredient mix.

12. The method according to claim 1, which further comprises pre-foaming of the ingredient mix prior to pressurizing.

13. The method according to claim 1, wherein the ingredient mix is cooled to a temperature of about −10° C. or lower prior to pressurizing.

14. The method according to claim 1, wherein the mix is pressurized with a gas with a pressure of more than 2000 bar.

15. The method according to claim 1, wherein the mix is pressurized with a gas with a pressure of more than 3000 bar.

16. The method according to claim 1, wherein the mix is pressurized with a gas with a pressure of more than 4000 bar.

17. The method according to claim 1, wherein the ingredient mix is frozen prior to being pressurized with the food grade gas.

18. The method according to claim 1 wherein the frozen confection is a low fat ice cream having a fat content of below 5% fat.

19. The method according to claim 1 wherein the frozen dessert is a low sugar ice cream having a sugar content of less than 10%.

* * * * *